United States Patent [19]

Shimada et al.

[11] Patent Number: 4,949,339
[45] Date of Patent: Aug. 14, 1990

[54] MULTIPLEXER APPARATUS ADAPTABLE FOR TWO KINDS OF TRANSMISSION RATES

[75] Inventors: Naohiro Shimada, Tokyo; Toshiyuki Nishina; Hiroyuki Sugawara, both of Miyagi, all of Japan

[73] Assignee: NEC Corporation, Tokyo, Japan

[21] Appl. No.: 240,334

[22] Filed: Sep. 6, 1988

[30] Foreign Application Priority Data

Sep. 3, 1987 [JP] Japan .................................. 62-219170
Sep. 3, 1987 [JP] Japan .................................. 62-219171
May 31, 1988 [JP] Japan .................................. 63-131663
May 31, 1988 [JP] Japan .................................. 63-131664

[51] Int. Cl.⁵ .......................... H04J 3/02; H04Q 11/04
[52] U.S. Cl. ........................................ 370/112; 370/84
[58] Field of Search ..................... 370/84, 112, 79; 328/104, 105; 307/243, 244

[56] References Cited

U.S. PATENT DOCUMENTS

| | | | |
|---|---|---|---|
| 3,952,298 | 4/1976 | Winkelmann et al. | 370/112 |
| 4,074,074 | 2/1978 | Boutmy et al. | 370/112 |
| 4,589,108 | 5/1986 | Billy | 370/84 |
| 4,658,152 | 4/1987 | Walters | 370/84 |
| 4,680,759 | 7/1987 | Miller et al. | 370/84 |
| 4,727,542 | 2/1988 | Rokugo et al. | 370/112 |

OTHER PUBLICATIONS

Recommendation G.702 by CCITT (The International Telegraph and Telephone Consultative Committee).
Recommendation G.703 by CCITT.
Recommendation G.742 by CCITT.
Recommendation G.751 by CCITT (The International Telegraph and Telephone Consultative Committee).

*Primary Examiner*—Douglas W. Olms
*Assistant Examiner*—Min Jung
*Attorney, Agent, or Firm*—Sughrue, Mion, Zinn, Macpeak & Seas

[57] ABSTRACT

A multiplexer apparatus supporting variable input bit stream rates in a single device is constructed by common use of a configurable buffer memory and a frequency dividing counter of the reference clock pulse. An externally generated selection signal corresponding to one of the variable input bit stream rates determines the length of the configurable buffer memory. The common frequency dividing counter of the reference clock pulse is designed by comparing bit patterns for the requisite initial counter values for each of the variable input bit stream rates.

14 Claims, 8 Drawing Sheets

8448 KBITS/s MULTIPLEXING FRAME STRUCTURE

FIG.1a SET I

FIG.1b SET II

FIG.1c SET III

FIG.1d SET IV

34368 KBITS/s MULTIPLEXING FRAME STRUCTURE

FIG.1e SET I

FIG.1f SET II

FIG.1g SET III

FIG.1h SET IV

F : FRAME ALIGNMENT SIGNAL (1111010000)
A : ALARM INDICATION TO THE REMOTE DIGITAL MULTIPLEX EQUIPMENT
R : BIT RESERVED FOR NATIONAL USE
C : JUSTIFICATION CONTROL BITS
B : BITS FROM TRIBUTARIES AVAILABLE FOR JUSTIFICATION

MULTIPLEXER APPARATUS ADAPTABLE FOR TWO KINDS OF TRANSMISSION RATES

BACKGROUND OF THE INVENTION

The invention relates to a multiplexer apparatus, and more particularly to a multiplexer apparatus conforming to Recommendations G.742 and G.751 by CCITT (The International Telegraph and Telephone Consultative Committee).

CCITT Recommendation G.742 describes in detail a multiplexer apparatus (2M/8M MUX or second order MUX) for multiplexing four first order bit streams of 2,048 Kbits/s into a second order bit stream of 8,448 Kbits/s, and G.751, describes a multiplexer apparatus (8M/34M MUX or third order MUX) for multiplexing four second order bit streams of 8,448 Kbits/s into a third order bit stream of 34,368 Kbits/s. Referencing Tables 1/G.742 and 1/G.751 of these two recommendations illustrates that the frame structures of 8 Mbits/s and 34 Mbits/s are identical except in frame length and bits per tributary. Realization of 2M/8M MUX and 8M/34M MUX devices in a single apparatus would result in size reduction, cost savings, and simplification of hardware. However, prior art does not teach the integration of 2M/8M MUX and 8M/34M MUX devices. Rather, such devices have been designed and manufactured as independent units.

SUMMARY OF THE INVENTION

An object of the invention, therefore, is to provide a multiplexer apparatus which can realize in a single apparatus both a second order MUX apparatus and a third order MUX apparatus conforming to the CCITT Recommendations G.742 and G.751, respectively.

According to the invention, a multiplexer apparatus for multiplexing four low-speed bit streams into a single high-speed bit stream comprises: buffer memory means, of which one unit is provided for each of the four low-speed bit streams, for temporarily storing the four low-speed bit streams; reference clock pulse generating means for generating a reference clock pulse for the operation of the multiplexer apparatus; pulse generating means for frequency-dividing the reference clock pulse by a predetermined number and generating read and write clock pulses for the buffer memory means, the pulse generating means being capable of varying the bit rates of the read and write clock pulses in response to the bit rates of the low-speed bit streams; and multiplexer means responsive to the reference clock pulse for multiplexing the four low-speed bit streams read out of the buffer memory means into the high-speed bit stream.

Meanwhile, a demultiplexer apparatus according to the invention for demultiplexing an inputted single high-speed bit stream into four low-speed bit streams comprises: reference clock pulse generating means for generating a reference clock pulse for the operation of the demultiplexer apparatus; demultiplexer means responsive to the reference clock pulse for demultiplexing the high-speed bit stream into the four low-speed bit streams; buffer memory means, of which one unit is provided for each of the four low-speed bit streams, for temporarily storing the four low-speed bit streams; and pulse generating means for frequency-dividing the reference clock pulse by a predetermined number and generating read and write clock pulses for said buffer memory means, the pulse generating means being capable of varying the bit rates of the read and write clock pulses in response to the bit rate of the high-speed bit stream.

BRIEF DESCRIPTION OF THE DRAWINGS

The above and other objects, features and advantages of the present invention will become apparent from the following detailed description when taken with accompanying drawings in which.

DETAILED DESCRIPTION OF THE PREFERRED EMBODIMENT

First, the operating principle of the present invention will be described with reference to FIGS. 1a to 1h illustrating frame structures of second order and third order bit streams conforming to the aforementioned CCITT Recommendations G.742 and G.751, respectively.

As the figures illustrate, each frame of the second and third order bit streams consists of four sets. The frame pulse pattern (frame alignment signals) are identical and are inserted in the first to tenth bits of the respective first sets in the two frames. Also common to the two frames are the various control bits and their positions in each set. the two frames. The two frames differ only in length; each set in the second order bit stream frame is 212 bits while each set in the third order bit stream frame is 384 bits.

The present invention makes use of these structural similarity between the two frames as well as the difference in set length between the two frames, to provide a single MUX apparatus usable for both second order and third order bit streams.

Figure 1A:
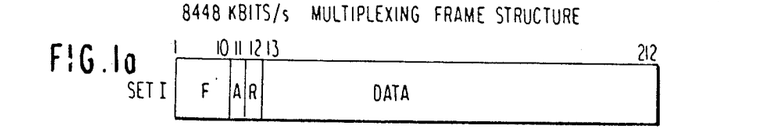
FIGS. 1a to 1h illustrate the frame structures of second order and third order bit streams.
Figure 1B:
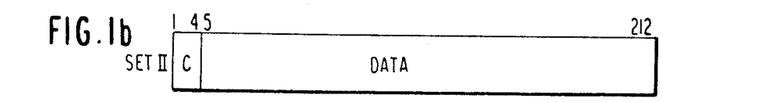
Figure 1C:
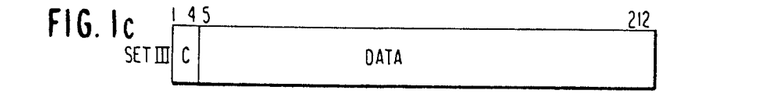
Figure 1D:
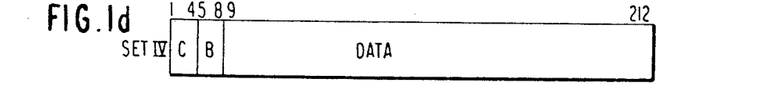
Figure 1E:
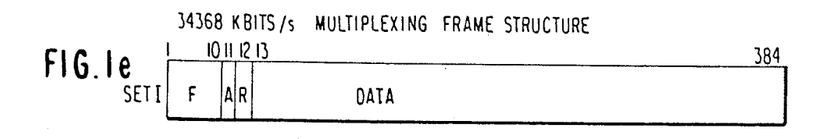
Figure 1F:
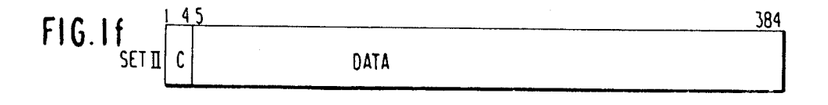
Figure 1G:
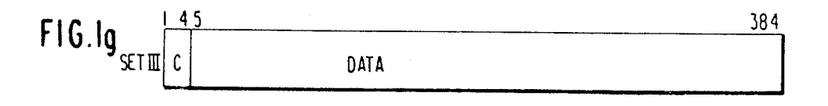
Figure 1H:
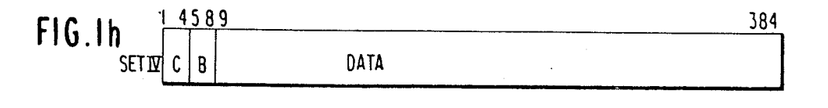
Figure 2:
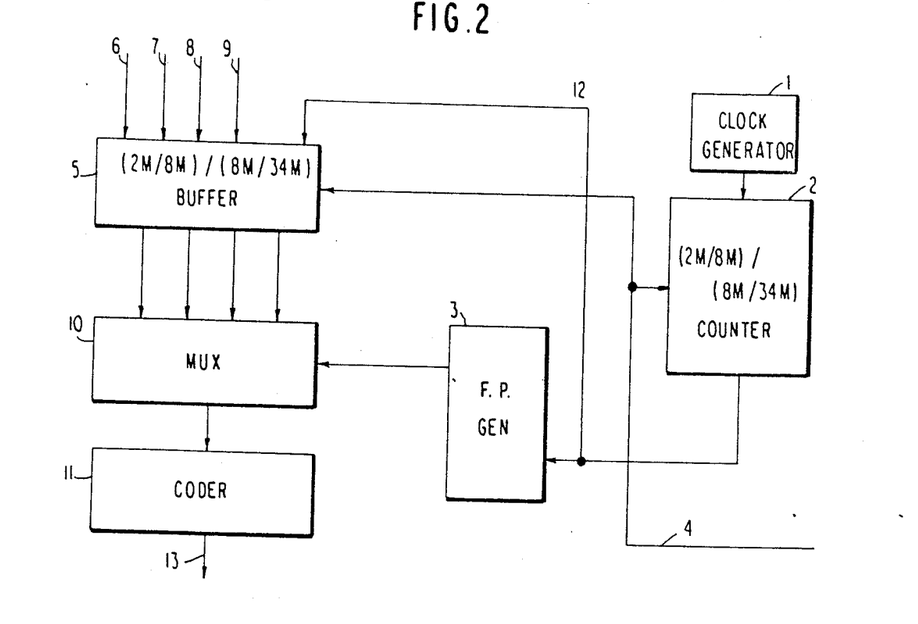
FIG. 2 is a block diagram illustrating a multiplexer apparatus according to the invention.

FIG. 2 is a block diagram illustrating a multiplexer apparatus according to the invention. In FIG. 2, clock pulses are supplied from a clock pulse generator 1, to a counter 2 for frequency division. The generator 1 produces clock pulses having a repetition frequency $f_o$ equal to the bit rate of the high-speed bit stream. The frequency is changed depending upon the bit rate of the MUX apparatus. The counter 2 frequency-divides the clock pulse to generate various timing signals required in the MUX apparatus, though the various timing signals are not differentiated in FIG. 2 for the sake of simplicity of illustration. The counter 2, further described later alters its frequency dividing ratio or total counts according to an externally generated selection signal 4 for determining the type of MUX apparatus to be operated. Frame pulse generator 3 generates a frame pulse pattern to establish synchronization in a frame period and supplies the frame pulse pattern to a MUX 10. Meanwhile, four asynchronous serial bit streams 6 to 9 are inputted from an external circuit (not shown) to a buffer memory 5 for bit rate adjustment. They are written into the buffer memory 5 in response to write clock pulses (not shown) supplied from the external circuit at the same time as the data is input on a channel-by-channel basis. As will be described later, the capacity of the buffer memory 5 can also be varied in response to the selection signal 4. Reading data out of the buffer memory 5 is achieved simultaneously for the four bit streams in response to read clock pulses which appear in one of the frequency-division outputs of the counter 2 whose frequency is equal to the bit rate of a low-speed bit stream. The MUX 10 multiplexes the read bit streams into the high-speed bit stream having the frame structure shown in FIGS. 1a to 1d or 1e to 1h, conforming to G.742 or G.751. The high-speed bit stream then enters a coder 11, undergoes code conversion of an HDB3 (high density bipolar 3) code defined by Recommondation G.703, and appears on a transmission path 13. In this embodiment of the invention, it is supposed that the second order MUX apparatus is selected when the selection signal 4 is at its high level, and the third order MUX apparatus is selected when said signal 4 is at its low level. In addition, the MUX 10 prohibits data reading from the buffer memory 5 when a frame pulse is inserted as well as so-called stuffing synchronization, i.e. measurement of the phase difference between the read and the write clock pulses on each bit stream and synchronization adjustment on that basis in the buffer memory 5. Further explanation is dispensed with here as they are already known to those skilled in the art. These operations are described in the U.S. Pat. No. 4,744,082.

Figure 3:
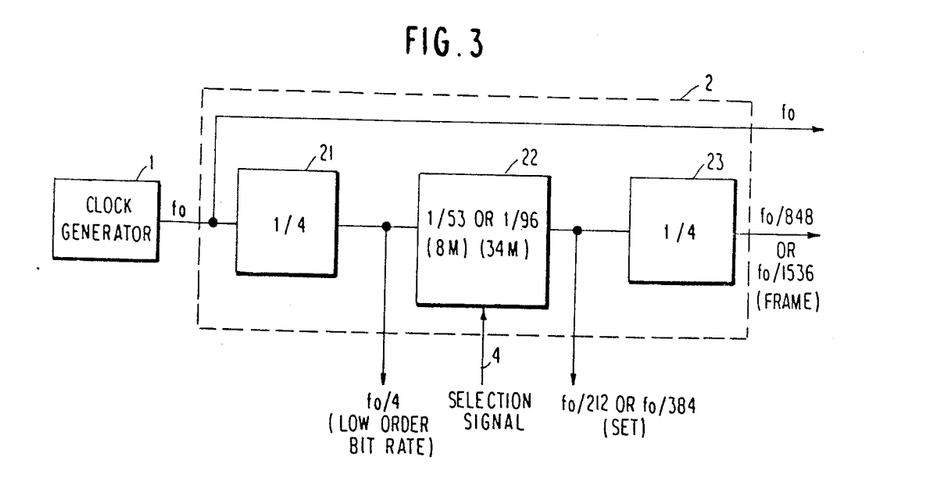
FIG. 3 is a block diagram illustrating a counter for use in the invention.

In FIG. 3 the counter 2 is internally composed of a plurality of counters 21 to 23 connected in series as illustrated in FIG. 3. Thus a reference clock pulse from the generator 1, having a frequency of $f_0$ equal to the bit rate of the high-speed bit stream, is frequency-divided by four in the first counter 21 into first clock pulses whose frequency is equal to the bit rate of the low-speed bit stream. The first clock pulses are further frequency-divided in the second counter 22 in a ratio determined by the selection signal 4, providing second clock pulses having a period of one set in the frame. They are then frequency-divided again by four in the third counter 23 into third clock pulses having a period of one frame. The clock pulses of $f_0$ are also supplied to the MUX 10. The frequency division ratio of the second counter 22 is selected to be 53 for the second order MUX apparatus or 96 for the third order MUX apparatus. These ratios are obtained by the following calculations: The ratio K is expressed by $K = L/(m_1 \times m_2)$ wherein L is the frame length and $m_1$ and $m_2$ are the frequency division ratios of the first and third counters 21 and 23. For the second order MUX apparatus, L is 848 bits, while for the third order MUX apparatus L is 1,536 bits. Thus, K will be 53 and 96 for the respective second and third order MUX apparaus. A divide by m counter where m is greater than $2^{n-1}$ and not greater than $2^n$ (m and n being positive integers) is generally realized with a counter starting from initial value of $2^n - m$ and having n flipflops (F/F's) connected in cascade. Thus, a divide by 53 and 96 counter comprises a counter capable of counting to $2^7 = 128$ and is composed by cascade-connecting F/F's in seven stages with means to switch the counter's initial value between $128 - 53 = 75$ and $128 - 96 = 32$.

Figure 4:
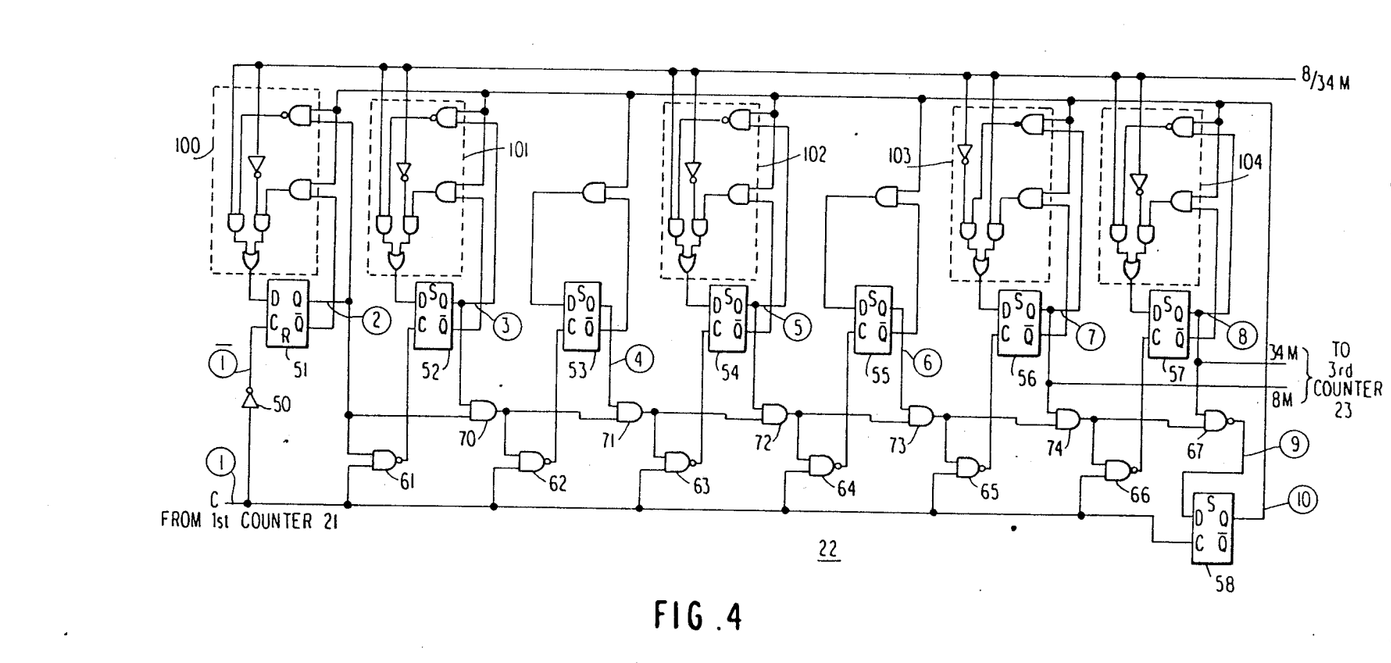
FIGS. 4 and 7 are detailed circuit diagrams of counters whose counts are variable.
Figure 6A:
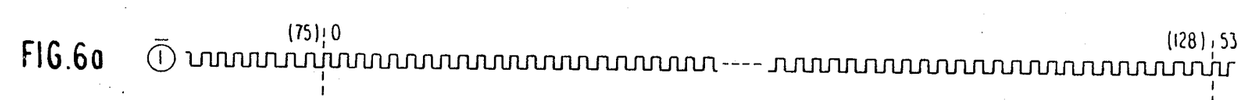
FIGS. 6a to 6k show a time chart for explaining the operation of the counter of FIG. 4.
Figure 6B:
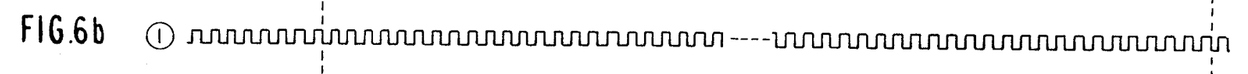
Figure 6C:
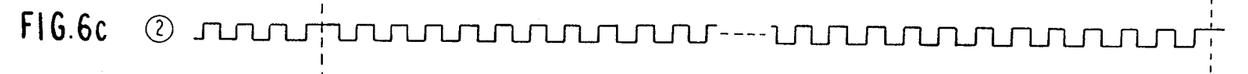
Figure 6D:
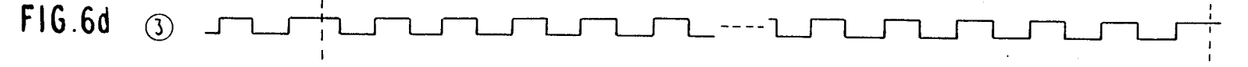
Figure 6E:
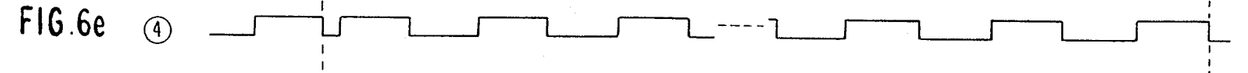
Figure 6F:
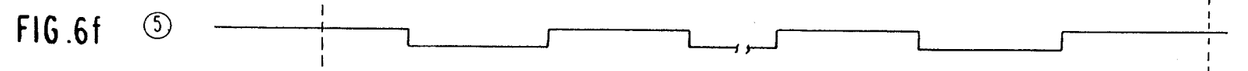
Figure 6G:
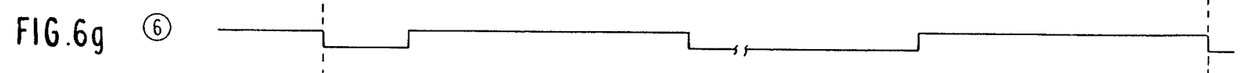
Figure 6H:
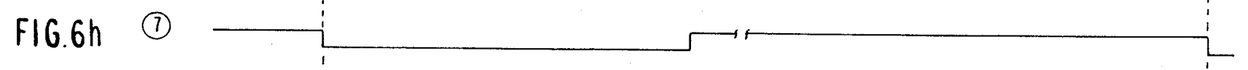
Figure 6I:
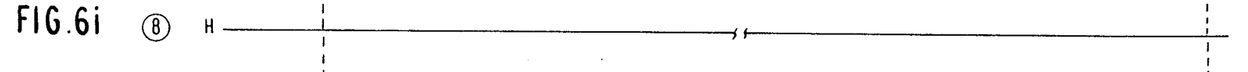
Figure 6J:
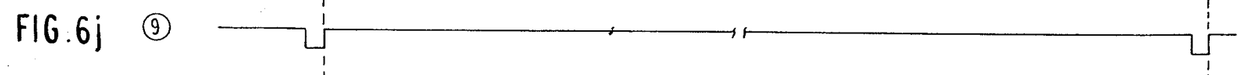
Figure 6K:
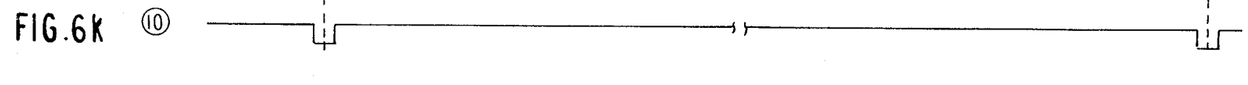

FIG. 4 is a circuit diagram illustrating the details of the second counter 22. In the drawing, the counter 22 comprises F/F's 51 to 57 which are connected in cascade and operable with a common clock pulse ① which is obtained by inverting the first clock pulse ①. The F/F's 51 to 57 are so sequentially weighted as to give weights of $2^0, 2^1, \ldots, 2^6$ to the F/F's 51, 52, ... 57, respectively. The counter 22 also comprises a F/F 58 operable with the first clock pulse. The F/F 58 also produces a timing signal for initial value setting of the counter 22. As described later with FIG. 6k, the timing signal is usually set to "1" and switches to "0" for the duration of one clock pulse period one half the clock pulse after the counter 22 has fully counted up.

The initial value for the second order MUX is $75 = 1001011$, and for the third order MUX is $32 = 0100000$. As is obvious from each bit pattern of these initial values the values of the third and fifth digits are commonly "0" for the two patterns but those of other differ. Thus, digit setting circuits 100 to 104 are connected to the F/F's 51, 52, 54, 56 and 57, respectively, to enable either of the patterns to be set as the initial value. As the digit setting circuits 100 to 102 and 104 set "1" for a second order MUX and "0" for a third order MUX, they can have the same structures. Digit setting circuit 103 sets "0" for a second order MUX and "1" for a third order MUX and therefore can have a structure similar to the other digit setting circuit, as described below. The counter 22 further comprises AND gates 70 to 74 for conveying a carry signal from the lower digit F/F to the higher digit F/F, as well as NAND gates 61 to 66 which are responsive to the first clock pulse for conveying the carry signal to the higher digit F/F.

Figure 5A:
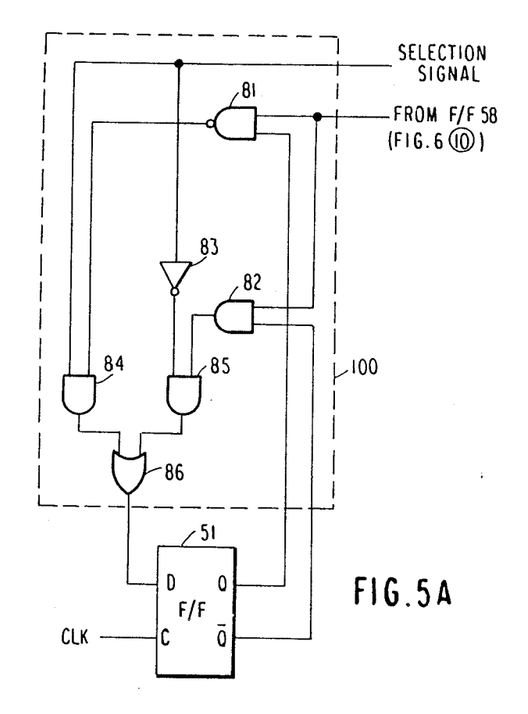
FIGS. 5A and 5B are circuit diagrams illustrating initial digit value setting circuits.

FIG. 5A shows a specific structure of the circuit 100 and represents digit setting circuits 100 to 102 and 104. The digit setting circuit 100 comprises: a NAND gate 81 for outputting "1" when setting an initial digit value; a first AND gate 82 for outputting "0" when setting an initial digit value; a second AND gate 84 for receiving the output of the NAND gate 81 and the second order MUX selecting signal from outside; a third AND gate 85 for receiving the output of the first AND gate 82 and the third order MUX selecting signal coming by way of an inverter 83: and an OR gate 86 for receiving the outputs of the second and third AND gates 84 and 85. The output of OR gate 86 supplies an initial digit value to the data terminal of the F/F 51.

Next will be described the operation of the digit setting circuit which operates for the second order MUX. As mentioned above, the selection of the second order MUX takes place in response to a selection signal "1". The inverter 83 inverts the selection signal "1", and disables the AND gate 85, which as a result supplies "0" to the OR gate 86 irrespective of the value of the output of the AND gate 82.

Meanwhile, the output of the AND gate 84 is determined by the output of the NAND gate 81 which receives the outputs from the F/F's 58 and 51, because the selection signal "1" enables the AND gate 84. The output of F/F 58 is "0" at the initial value setting as mentioned above and the output of F/F 51 is "1" since the initial value setting is performed after the count of the counter 22 reaches the maximum value. As a result, the NAND gate 81 produces "1" which goes through the AND gate 84 to supply the initial digit value "1" to the F/F 51 through the OR gate 86.

For the selection of the third order MUX, since the selection signal turns to "0", the AND gate 84 is disabled while the AND gate 85 is enabled. Thus, the initial digit value at F/F 51 is set to "0" as a result of the output of the AND gate 82.

Similarly, the initial digit value "0" or "1" is set to the F/F's 52, 54 and 57, in response to the selection signal "1" or "0".

Figure 5B:
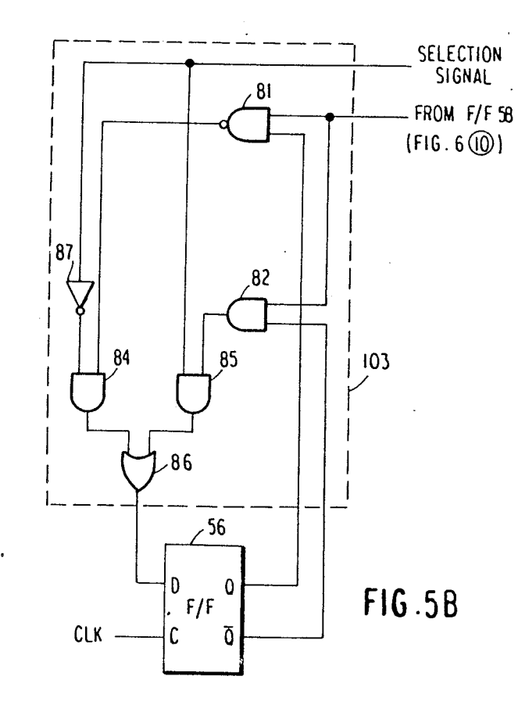

FIG. 5B is a circuit diagram illustrating a specific example of an initial digit value setting circuit 103. Setting circuit 103, unlike setting circuit 100, sets the initial value at "0" when the second order MUX is selected and "1" when the third order MUX is selected. Therefore this setting circuit 103 can be realized in the same structure as the setting circuit 100 of FIG. 5A except that the inverter 87 is connected to one of the input terminals of the AND gate 84.

The operation of the counter 22 shown in FIG. 4 will be described with reference to the timing chart of FIGS. 6a to 6k. In the drawings, a clock input terminal C of the F/F 58 is supplied with the first clock pulse (FIG. 6b) from the counter 21 (FIG. 3) while the F/F 51 receives the inverted first clock pulse (FIG. 6a) which is obtained through the inverter 50.

FIGS. 6c to 6i represent the output values of the F/F's 51 to 57, respectively. When the Q outputs of all F/F's 51 to 57 turn "1" (indicating that the counter has fully counted up), the output of the NAND gate 67 changes from "1" to "0" (FIG. 6j), and the output of the F/F 58 actuated by the first clock pulse (FIG. 6b) turns to a low level (FIG. 6k) a half clock pulse period after the output value of the NAND gate 67 has changed. When the output of the F/F 58 (FIG. 6k) falls to a low level, the NAND gate in each digit setting circuit turns ON, and initial digit values are set as described above. In the F/F's 53 and 55, whose initial digit values are "0" for both the second and third order, MUX apparatuses "0" values are set when the AND gate turns OFF. If a second order MUX is selected, the F/F 56 is set so that the Q-output rises once in every period of the counter 22.

Similarly, when the third order MUX is selected, the output of the F/F 57 (FIG. 6i) is used.

Figure 7:
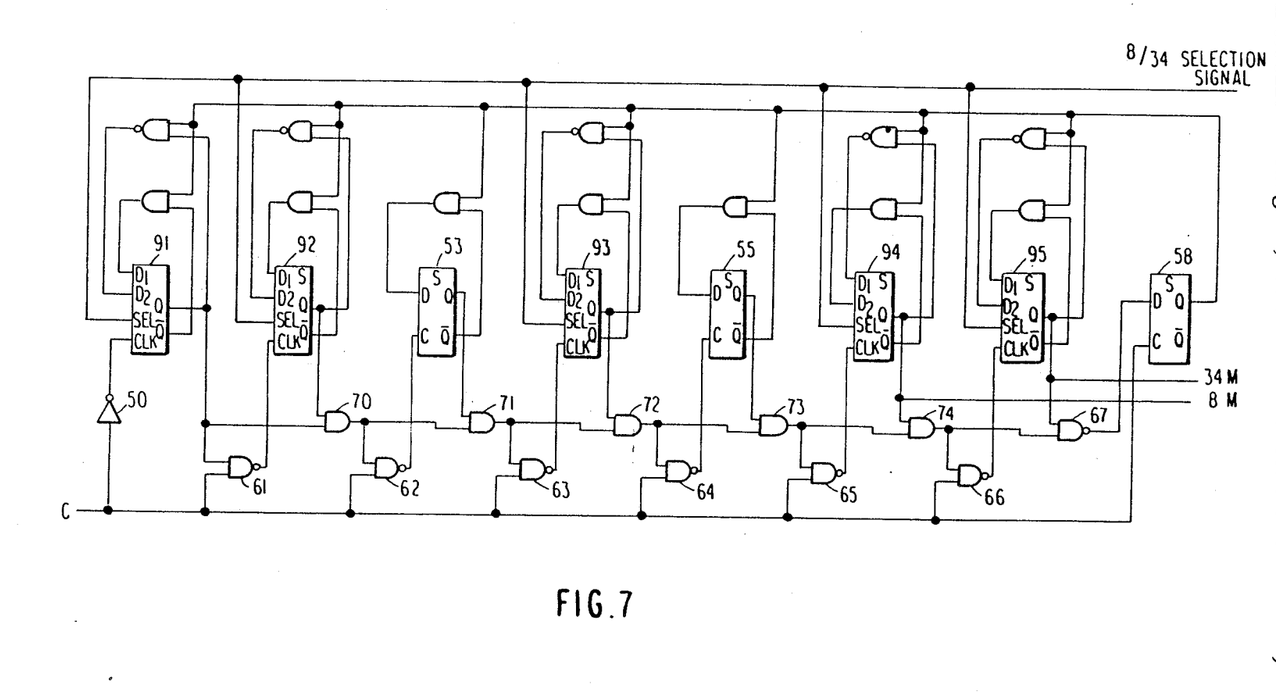

FIG. 7 illustrates another example of the second counter 22, gate arrays 91 to 95, in which a part of the digit selecting circuits of FIG. 4 are built into F/F's and therefore generates to a further reduction in hardware. For instance, the gate array 91 comprises the second and third AND gates 84 and 85, OR gate 86, inverter 83 and F/F 51 in FIG. 5A, and has data input terminals D1 and D2, a selection terminal SEL, a clock terminal CLK, and output terminals Q and $\overline{Q}$. The data terminal D1 and D2 are supplied with the outputs of the NAND gate 81 and the first AND gate 82; the selection terminal SEL, with the selection signal; and the clock terminal CLK, with the clock pulse, respectively. It operates in the same way as the counter of FIG. 4.

Figure 8:
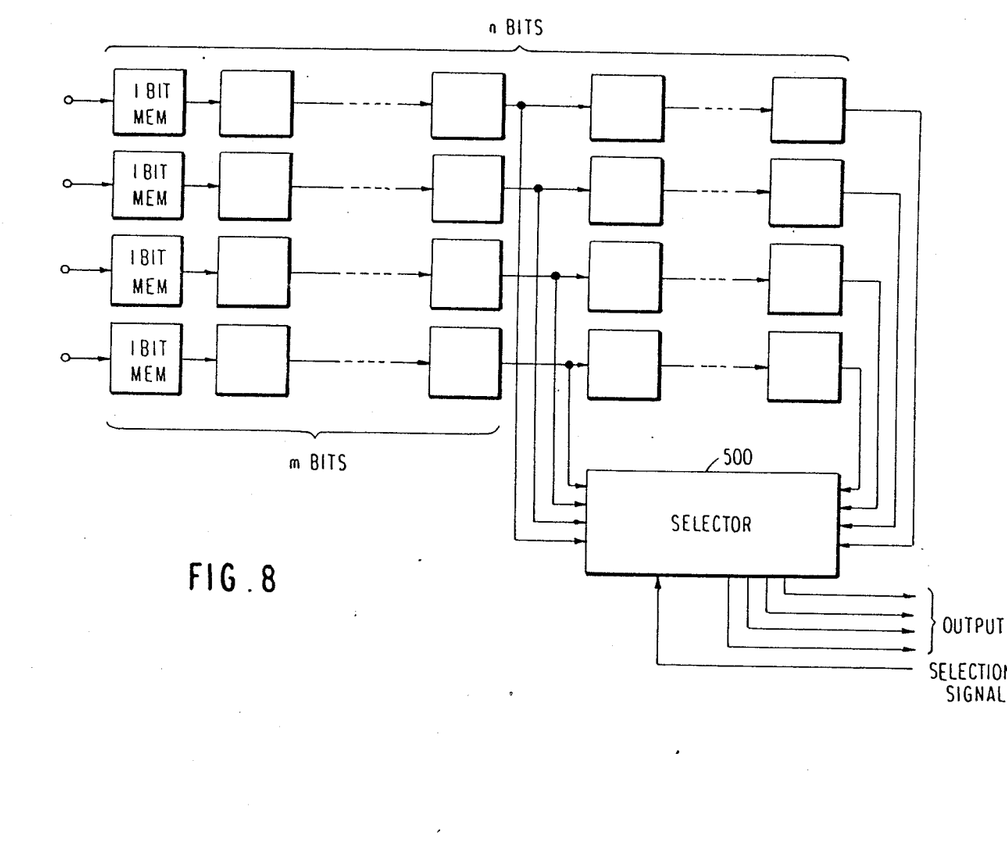
FIG. 8 is a circuit diagram illustrating an example of buffer memory.

FIG. 8 is a block diagram illustrating one example of the buffer memory 5. In FIG. 8, one-bit memories are arranged in four parallel rows, each row comprising n such memories. Assuming that the length of the buffer memory is m bits for the second order MUX and n bits for the third order MUX, the buffer memory 5 is structured so as to operate with a selector 500 choosing either the m-bits or the n-bits length memory. The selection for n-bits or m-bits memory is determined according to the selection signal provided from outside. The length of this buffer memory can be determined by considering of the jitter tolerance and other pertinent requirements. Although m is smaller than n in FIG. 8, m may be either equal to or greater than n if the requirements are met.

Figure 9:
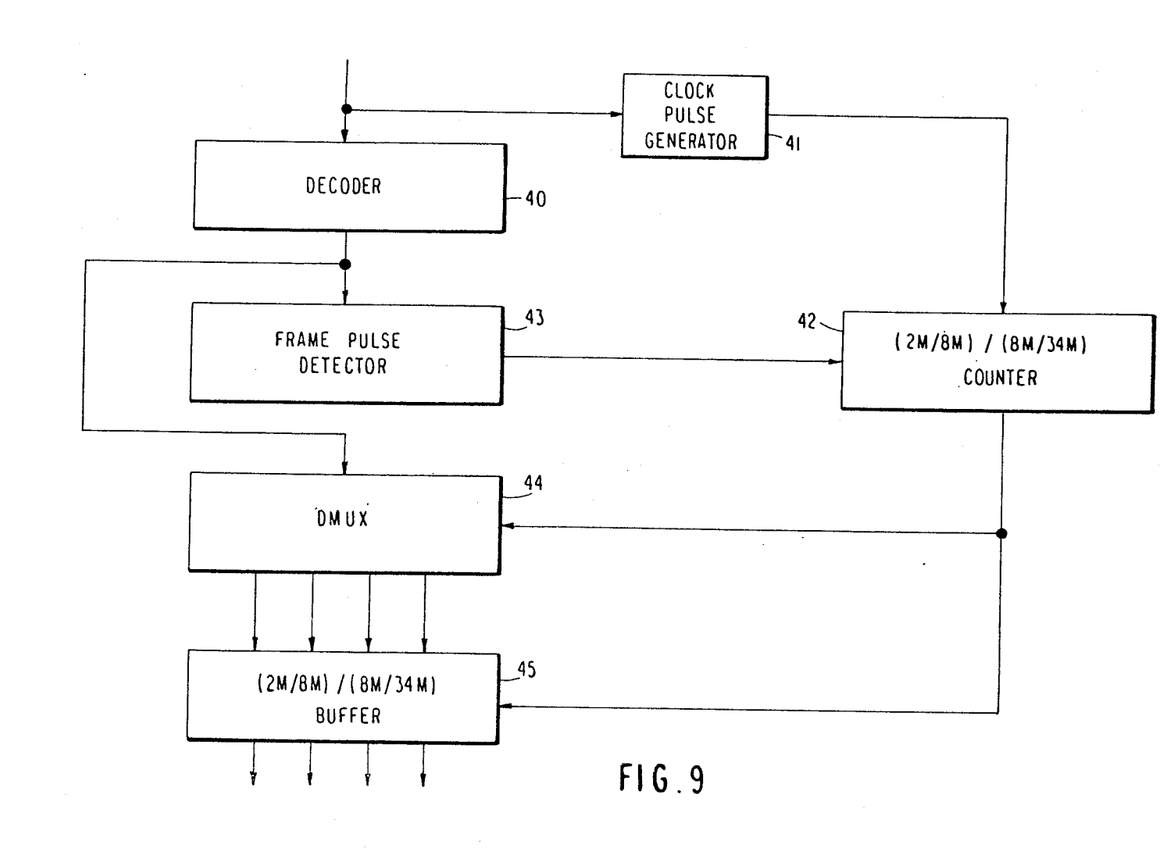
FIG. 9 is a block diagram illustrating a demultiplexer apparatus according to the invention.

FIG. 9 is a block diagram illustrating a demultiplexer apparatus according to the present invention. The demultiplexer apparatus comprises: a decoder 40 for decoding the encoded bit stream in the coder of the MUX; a clock pulse generator 41 for extracting reference clock pulses from the encoded bit stream; a counter 42 for producing various timing signals used in the DMUX; a frame pulse detector 43 for detecting a frame pulse from the decoded bit stream and for supplying a sync signal to the counter 42; a demultiplexer (DMUX) 44 for separating the decoded bit stream in response to clock pulses from the counter 42 into the four bit streams, and a buffer memory 45 for temporally storing the four bit streams. Here again, stuffing bits and frame pulses, inserted on the MUX apparatus, are eliminated as these are known to those skilled in the art. Further description of the buffer memory 45 and counter 42 used in the DMUX apparatus is also dispensed with, because the same buffer memory and counter for use in the MUX can be applied.

As hitherto described, the second and third order MUX apparatus DMUX apparatuses conforming to the CCITT Recommendations G.742 and G.751 are realized by permitting common use of the counter for frequency division of the reference clock pulse as well as common use of the buffer memory. The results offer the advantage of a single apparatus performing the function.

What is claimed is:

1. A multiplexer apparatus adaptable for operation at two or more different transmission rates, and for multiplexing at least two lower speed bit streams, each of said lower speed bit streams at a selected one of a plurality of predetermined bit rates, into a single higher speed bits stream at a selected one of a plurality of predetermined bit rates, comprising:
   reference clock means for supplying a reference clock for the operation of the multiplexer apparatus;
   pulse generating means responsive to the reference clock for generating a set of timing pulses, pulse rates of the set of timing pulses being changed in response to a selection signal designating bit rates of the lower speed bit streams and the higher speed bit stream;
   buffer memory means responsive to selected timing pulses of the set of timing pulses for temporarily storing said lower speed bit streams; and
   multiplexer means responsive to the set of timing pulses for multiplexing said lower speed bit streams read out of said buffer memory means into said higher speed bit stream.

2. A multiplexer apparatus as claimed in claim 1 wherein said buffer memory means varies its capacity responsive to said selection signal.

3. A multiplexer apparatus as claimed in claim 1, wherein four of said lower speed bit streams are multiplexed into a single bit stream at a higher data rate.

4. A multiplexer apparatus as claimed in claim 1 wherein there are four of said lower speed bit streams at said predetermined bit rate and wherein said pulse generating means comprises three counters connected in series, the input to a first counter being said reference clock, said first counter dividing said reference clock by four, a second counter receiving the output of said first counter and dividing the output of said first counter by a ratio determined by said selection signal, and a third counter receiving the output of said second counter and dividing the output of said second counter by four.

5. A multiplexer apparatus as claimed in claim 4, wherein said second counter is composed of n flip-flops connected in cascade and sequentially weighted to give weights of powers of 2, each of said flip-flops having associated digit setting circuitry for the purpose of setting an initial counter value.

6. A multiplexer apparatus as claimed in claim 5 wherein said digit setting circuitry is composed of digital logic devices responsive to said selection signal, and wherein said digit setting circuitry produces a predetermined bit pattern for setting said initial counter vlaue.

7. A multiplexer apparatus as claimed in claim 6 wherein said digit setting circuitry and said flip-flops are incorporated into a gate array device.

8. A demultiplexer apparatus adaptable for operation at two or more different transmission rates, and for demultiplexing a single higher speed bit stream at a selected one of a plurality of predetermined bit rates into at least two lower speed bit streams, each of said lower speed bit streams at a selected one of a plurality of predetermined bit rates, comprising:

reference clock means for supplying a reference clock pulse for the operation of the demultiplexer apparatus;

pulse generating means responsive to the reference clock for generating a set of timing pulses, pulse rates of said set of timing pulses being changed in response to a selection signal designating bit rates of the lower speed bit streams and the higher speed bit stream;

demultiplexer means responsive to the set of timing pulses for demultiplexing said higher speed bit stream into said lower speed bit streams; and buffer memory means responsive to selected timing pulses of the set of timing pulses for temporarily storing said lower speed bit streams.

9. A demultiplexer apparatus as claimed in claim 8 wherein said buffer memory means varies its capacity responsive to said selection signal.

10. A demultiplexer apparatus as claimed in claim 2 wherein said higher speed bit stream is demultiplexed into four lower speed bit streams.

11. A demultiplexer apparatus as claimed in claim 2 wherein there are four of said lower speed bit streams and wherein said pulse generating means comprises three counters connected in series, the input to a first counter being said reference clock, said first counter dividing said reference clock by four, a second counter receiving the output of said first counter and dividing the output of said first counter by a ratio determined by said selection signal, and a third counter receiving the output of said second counter and dividing the output of said second counter by four.

12. A demultiplexer apparatus as claimed in claim 11 wherein said second counter is composed of n flip-flops connected in cascade and sequentially weighted to give weights of powers of 2, each of said flip-flops having associated digit setting circuitry for the purpose of setting an initial counter value.

13. A demultiplexer apparatus as claimed in claim 12 wherein said digit setting circuitry is composed of digital logic devices responsive to said selection signal, and wherein said digit setting circuitry produces a predetermined bit pattern for setting said initial counters value.

14. A demultiplexer apparatus as claimed in claim 13 wherein said digit setting circuitry and said flip-flops are incorporated into a gate array device.

* * * * *

UNITED STATES PATENT AND TRADEMARK OFFICE
CERTIFICATE OF CORRECTION

PATENT NO. : 4,949,339

DATED : August 14, 1990

INVENTOR(S) : Naohiro Shimada and Toshiyuki Nishina, and Hiroyuki Sugawara

It is certified that error appears in the above-identified patent and that said Letters Patent is hereby corrected as shown below:

Col. 2, line 42, delete "the two frames".

Col. 2, line 66, after "pulse" insert ---pattern---;

Col. 6, line 26, delete "DMUX apparatuses", and insert --/DMUX apparatus--.

Signed and Sealed this

Ninth Day of June, 1992

*Attest:*

DOUGLAS B. COMER

*Attesting Officer*     *Acting Commissioner of Patents and Trademarks*